US007463262B2

(12) United States Patent
Ema

(10) Patent No.: US 7,463,262 B2
(45) Date of Patent: Dec. 9, 2008

(54) IMAGE PROCESSING APPARATUS AND METHOD

(75) Inventor: Takehiro Ema, Otawara (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 207 days.

(21) Appl. No.: 11/237,960

(22) Filed: Sep. 29, 2005

(65) Prior Publication Data

US 2006/0099558 A1 May 11, 2006

(30) Foreign Application Priority Data

Sep. 30, 2004 (JP) ............................. 2004-287280

(51) Int. Cl.
*G06T 15/10* (2006.01)
(52) U.S. Cl. .................. 345/427; 345/423; 345/424; 345/441; 345/442; 345/443; 434/262; 356/251; 382/128
(58) Field of Classification Search ................. 345/423, 345/424, 427, 441, 442, 443; 434/262; 356/251
See application file for complete search history.

(56) References Cited

U.S. PATENT DOCUMENTS 5,971,767 A 10/1999 Kaufman et al.
7,245,754 B2 * 7/2007 Goto ......................... 382/128

2006/0064006 A1 * 3/2006 Strommer et al. ........... 600/415

FOREIGN PATENT DOCUMENTS

JP 2001-14496 1/2001
JP 2004-283373 10/2004
WO WO 2004/049265 A1 6/2004

OTHER PUBLICATIONS

Armin Kanitsar, et al., "CPR-Curved Planar Reformation", IEEE Visualization 2002, XP-010633273, Oct. 27, 2002, pp. 37-44.
Raghav Raman, et al., "Automated Generation of Curved Planar Reformations from Volume Data: Method and Evaluation", Radiology, vol. 223, No. 1, XP-002363485, Apr. 2002, pp. 275-280.

(Continued)

*Primary Examiner*—Kimbinh T Nguyen
(74) *Attorney, Agent, or Firm*—Oblon, Spivak, McClelland, Maier & Neustadt, P.C.

(57) ABSTRACT

A plurality of position data are input, which indicate the position of an observation target defined in a three-dimensional space, on its three-dimensional image, which is viewed from a predetermined view point along a predetermined line-of-sight direction. A curved cross-section in the line-of-sight direction is calculated from the plurality of position data and line-of-sight data including the predetermined view point and the predetermined line-of-sight direction. A projection image is generated by projecting the three-dimensional image on the calculated curved cross-section onto a projection surface along the line-of-sight direction. The projection image is then displayed.

24 Claims, 10 Drawing Sheets

OTHER PUBLICATIONS

Armin Kanitsar, et al., "Computed Tomography Angiography: A Case Study of Peripheral Vessel Investigation", IEEE, Conference on Visualization 2001, XP-002338528, Oct. 21, 2001, pp. 477-480.

Matthijs Oudkerk, et al., "Comparison of contrast-enhanced magnetic resonance angiography and conventional pulmonary angiography for the diagnosis of pulmonary embolism: a prospective study", The Lancet, vol. 359, No. 9318, XP-004790810, May 11, 2002, pp. 1643-1647.

Hitoshi Yamagata, et al. "Development of Fusion 3D Imaging Providing High Speed and High Image Quality", 2002, Medical Review, vol. 26, No. 1, pp. 19-22.

Ali Shahrokni, et al. "Fast Skeletonization Algorithm for 3-D Elongated Objects", 2001, Proceedings of SPIE, vol. 4322, 8 pages.

Onno Wink, et al. "Fast Delineation and Visualization of Vessels in 3-D Angiographic Images", IEEE Transactions on Medical Imaging, vol. 19, No. 4, Apr. 2000, pp. 337-346.

\* cited by examiner

IMAGE PROCESSING APPARATUS AND METHOD

CROSS-REFERENCE TO RELATED APPLICATIONS

This application is based upon and claims the benefit of priority from prior Japanese Patent Application No. 2004-287280, filed Sep. 30, 2004, the entire contents of which are incorporated herein by reference.

BACKGROUND OF THE INVENTION

1. Field of the Invention

The present invention relates to an image processing apparatus and method which can provide an image allowing easy comprehension of a curved cross-sectional shape of a target under observation.

2. Description of the Related Art

Image processing apparatuses recently used in the field of medical images are widely used in many hospitals, examination organizations, and the like in combination with ultrasound diagnostic apparatuses, X-ray CT scanners, magnetic resonance imaging apparatuses, and the like. This image processing apparatus can provide various kinds of images useful as clinical information along with increases in image processing speed and resolution, and is used, for example, for imaging of an alimentary tract lumen which is performed to check blood vessel running, an alimentary tract tumor, the formation of a plaque (blood clot), stenochoria, and the like in a simulation or the like before a surgical operation.

In such an image processing apparatus, as a conventional method of displaying a cross-section of a target in a manner easy to understand on the basis of a three-dimensional image including a curved observation target, a technique called curved multi-planar reformatting (Curved MPR: to be abbreviated as "C-MPR") is known. For example, an image is formed by C-MPR according to the following sequence: (1) setting polygonal lines on the screen on which an overall three-dimensional image is displayed, (2) forming a cross-section (C-MPR cross-section) containing the polygonal lines set perpendicular to the screen, and (3) displaying pixel values on the cross-section as a two-dimensional image.

FIG. 6 is a view for explaining a C-MPR image (an image generated by C-MPR). Referring to FIG. 6, polygonal lines a, b, c, and d which define a C-MPR cross-section are formed by four straight lines. A C-MPR image is generated by displaying pixel values on the C-MPR cross-section comprising four planes which include the respective polygonal lines and are perpendicular to the screen without any change. That is, C-MPR is a method of displaying pixel values side by side on one plane, which are not present on a plane as a whole. According to this technique, images on a curved surface comprising planes can be observed at once.

Another method of displaying pixels values side by side on one plane, which are not present on a plane as a whole, is known. For example, this method is executed according to the following sequence: (1) setting polygonal lines on the screen on which an overall three-dimensional image is displayed, (2) forming a cross-section (C-PC cross-section) containing the polygonal lines set perpendicular to the screen, and (3) displaying only pixel values on the cross-section by projecting them on a projection surface in consideration of a line of sight. In this case, this display method will be referred to as curved plane cut (C-PC).

FIG. 7 is a view for explaining a C-PC image. Referring to FIG. 7, the right-side portion indicates a C-PC image, which is displayed to show the shape of a C-PC cross-section. An overall C-PC cross-section can be observed at different lines of sight upon rotation.

BRIEF SUMMARY OF THE INVENTION

The following problems arise in the conventional cross-section display methods.

First of all, since a C-MPR image is an image obtained by transforming a curved surface into planes, the shape of an observation target cannot be comprehended. For example, in medical image diagnosis, a winding observation target such as a blood vessel is observed. However, since a curved surface cannot always be designated so as to allow an observer to comprehend how the overall observation target is curved, the observer may not comprehend how the overall observation target is curved.

As is obvious from the above description of a C-MPR image, the observer observes a C-MPR image from a direction different from the direction in which he/she has observed a three-dimensional image when setting a C-MPR cross-section. It is natural for the observer to observe a cross-section of the observation target, at this point of time, in the same direction as that in which he/she sees the three-dimensional image. However, this requirement cannot be satisfied by a C-MPR image.

Assume that after a C-MPR image is displayed, an observation target is to be observed from a different direction (a different C-MPR image is to be set). In this case, another C-MPR cross-section must be set. This is cumbersome operation, and hence a heavy operation burden is placed on the observer. In an actual medical site, there is a requirement to observe an observation target including a cross-section of a blood vessel from various directions. In order to meet this requirement, therefore, C-MPR cross-section setting must be repeated, and hence it is unrealistic to realize this technique.

Note that since a C-PC image is displayed without transforming an image on a curved surface comprising planes into planes, this technique is slightly superior to C-MPR in terms of comprehending the shape of an observation target. However, C-PC uses the same curved surface designating method as that in C-MPR, and hence there is a limit to the comprehension of the overall shape.

In addition, an entire C-PC cross-section can be rotated and observed from different directions. However, the C-PC cross-section remains the same, and hence this operation is no more than to observe the same data from different directions. Therefore, no C-PC image can satisfy the requirement to observe a cross-section of an observation target from the same direction as that in which a three-dimensional image is seen at a given time point.

Furthermore, assume that after a C-PC image is displayed, an observation target is to be observed from a different direction. In this case, as in the case of C-MPR, another C-PC cross-section must be set. Therefore, the observer needs to repeat C-PC cross-section setting many times.

The present invention has been made in consideration of the above situations, and has as its object to provide an image processing apparatus and method which can generate useful cross-sectional images with a light operation burden when a cross-sectional image of a curved observation target is to be generated.

According to an aspect of the present invention, there is provided an image processing apparatus comprising a position data specifying unit which specifies a plurality of position data indicating a position of an input observation target on three-dimensional image data of the observation target, a curved cross-section calculating unit which calculates a first curved cross-section in a desired line-of-sight direction from the plurality of position data and line-of-sight data including the line-of-sight direction, a projection image generating unit which generates a projection image by projecting the three-dimensional image data on the first curved cross-section or three-dimensional image data concerning an area with reference to the first curved cross-section onto a projection surface along the line-of-sight direction, and a display unit which displays the projection image.

According to another aspect of the present invention, there is provided a medical image diagnosis apparatus comprising an acquiring unit which acquires three-dimensional image data of an observation target, a position data specifying data which specifies a plurality of position data indicating a position of the observation target on the three-dimensional image data, a curved cross-section calculating unit which calculates a first curved cross-section in the line-of-sight direction from the plurality of position data and line-of-sight data including a desired line-of-sight direction, a projection image generating unit which generates a projection image by projecting the three-dimensional image data on the first curved cross-section or three-dimensional image data concerning an area with reference to the first curved cross-section onto a projection surface along the line-of-sight direction, and a display unit which displays the projection image.

According to another aspect of the present invention, there is provided an image processing method comprising specifying a plurality of position data indicating a position of an input observation target on three-dimensional image data of the observation target, calculating a first curved cross-section in a desired line-of-sight direction from the plurality of position data and line-of-sight data including the line-of-sight direction, generating a projection image by projecting the three-dimensional image data on the first curved cross-section or three-dimensional image data concerning an area with reference to the first curved cross-section onto a projection surface along the line-of-sight direction, and displaying the projection image.

DETAILED DESCRIPTION OF THE INVENTION

Figure 1:
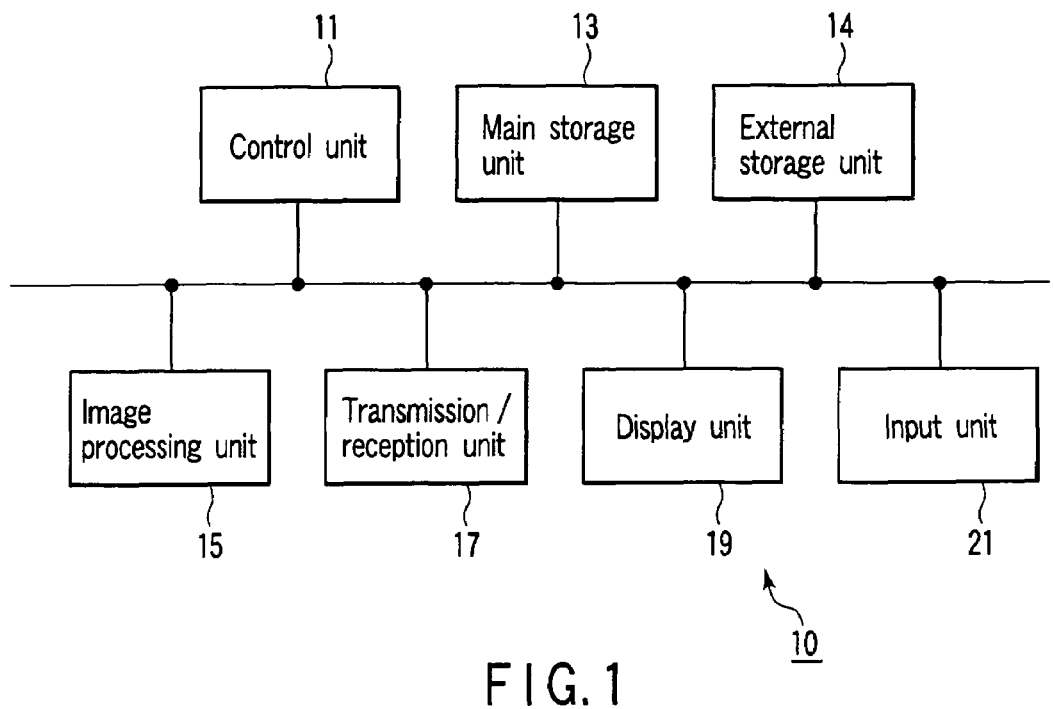
FIG. 1 is a block diagram showing an image processing apparatus 10 according to this embodiment.

The first and second embodiments of the present invention will be described with reference to the views of the accompanying drawing. Note that in the following description, the same reference numerals denote constituent elements having substantially the same functions and arrangements, and a repetitive description will be made only when required.

Note that an image processing apparatus according to each embodiment is assumed to be a unitized medical workstation which executes image processing to be described later by developing a dedicated program in a working memory. However, the present invention is not limited to this and may apply to an image processing apparatus or the like incorporated in various kinds of modalities such as a medical image dedicated viewer, X-ray computed tomography apparatus, ultrasound diagnosis apparatus, and magnetic resonance imaging apparatus.

In each embodiment, a three-dimensional image means three-dimensional image data to be displayed instead of a displayed image. This three-dimensional image is to be defined in a real space (a three-dimensional image space or volume space) and is sometimes called volume data.

FIRST EMBODIMENT

FIG. 1 is a block diagram of an image processing apparatus 10 according to this embodiment. As shown in FIG. 1, the image processing apparatus 10 comprises a control unit 11, main storage unit 13, external storage unit 14, image processing unit 15, transmission/reception unit 17, display unit 19, and input unit 21.

The control unit 11 serves as a control center to statically or dynamically control the image processing apparatus 10.

The main storage unit 13 stores the image data (irrespective of before or after reconstruction) acquired by various kinds of modalities which are received by the transmission/reception unit 17 through a network. The main storage unit 13 stores a dedicated program for executing curved cross-sectional image generation processing (to be described later).

The external storage unit 14 is a recording medium such as a magnetic disk (e.g., a floppy disk or hard disk), an optical disk (e.g., a CD-ROM or DVD), or a semiconductor memory. The external storage unit 14 may be designed to store at least part of image data, programs, and the like to be stored in the main storage unit 13.

The image processing unit 15 executes curved cross-sectional image generation processing. The arrangement of the image processing unit 15 and the contents of the curved cross-sectional image generation processing will be described in detail later.

The transmission/reception unit 17 transmits/receives various kinds of data including image data to/from various kinds of medical imaging apparatuses (e.g., an X-ray computed tomography apparatus, ultrasound diagnostic apparatuses, or magnetic resonance imaging apparatus) through a network.

The display unit 19 is an output unit which displays a projection image received from a three-dimensional image projection unit 157 in a predetermined form.

The input unit 21 has input devices (e.g., a mouse, trackball, mode switches, and keyboard) for inputting various kinds of commands, instructions, and information from an observer (operator).

(Function and Arrangement of Image Processing Unit 15)

Figure 2:
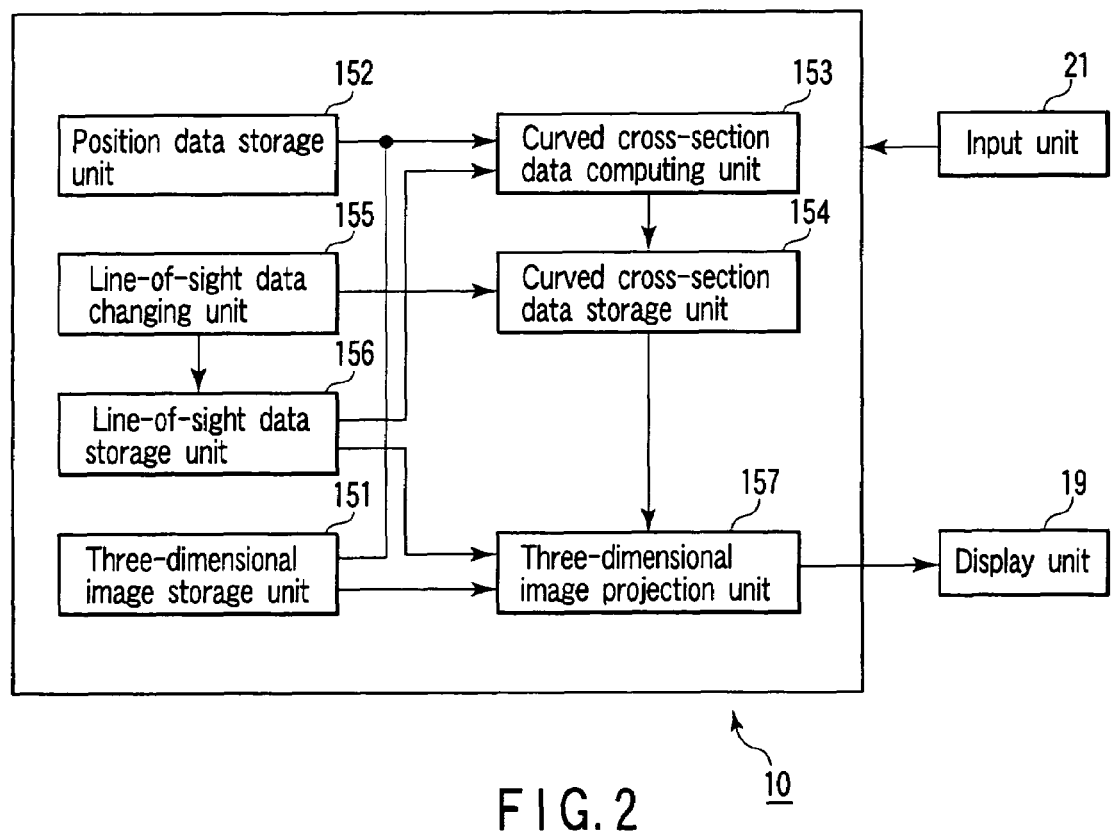
FIG. 2 is a block diagram showing the arrangement of an image processing unit 15.

FIG. 2 is a block diagram showing the arrangement of the image processing unit 15. As shown in FIG. 15, the image processing unit 15 comprises a three-dimensional image storage unit 151, a position data storage unit 152, a curved cross-section data computing unit 153, a curved cross-section data storage unit 154, a line-of-sight data changing unit 155, a line-of-sight data storage unit 156, and the three-dimensional image projection unit 157.

Note that the function and arrangement of the image processing unit 15 can be implemented by, for example, installing a dedicated program for executing this processing in the image processing apparatus 10, reading out the program, and developing it in an auxiliary storage unit (memory) (not shown) under the control of the control unit 11. Obviously, a program which can implement the function of the image processing unit 15 or the like can be distributed while being stored in a recording medium such as a magnetic disk (a floppy disk or hard disk), an optical disk (e.g., a CD-ROM or DVD), or a semiconductor memory.

This embodiment, however, is not limited to such an arrangement based on software. For example, at least part of the arrangement shown in FIG. 2 may be implemented by a hardware arrangement using a graphic card and the like.

The three-dimensional image storage unit 151 stores three-dimensional image data read out from the main storage unit 13.

The position data storage unit 152 stores predetermined position data (e.g., blood vessel center line data (to be described later) which is a curved observation target in a three-dimensional image) input through the input unit 21, another apparatus connected via a network, and a detachable external storage such as a CD.

The curved cross-section data computing unit 153 inputs blood vessel center line data read out from the position data storage unit 152 and line-of-sight data read out from the line-of-sight data storage unit 156 and generates curved cross-section data by predetermined computation. This computation will be described in detail later.

The curved cross-section data storage unit 154 stores the curved cross-section data generated by the curved cross-section data computing unit 153.

The line-of-sight data changing unit 155 generates line-of-sight data in response to operation from the input unit 21 which is performed to change the line of sight. More specifically, the line-of-sight data changing unit 155 regards the direction and degree of movement of a mouse or trackball as an amount of change in view point or line of sight on the basis of input data from the input unit 21, and generates line-of-sight data defining at least a line-of-sight direction. Note that line-of-sight data may define a view point as well as a line-of-sight direction as needed.

The line-of-sight data storage unit 156 stores the line-of-sight data generated by the line-of-sight data changing unit 155.

The three-dimensional image projection unit 157 generates a projection image by projecting a three-dimensional image using a projection method indicated by the control unit 11 on the basis of the three-dimensional image read out from the three-dimensional image storage unit 151 and the line-of-sight data read out from the line-of-sight data storage unit 156. The generated projection image is output to an image display unit 29 to be displayed in a predetermined form.

In addition, a projection image is generated by executing predetermined projection processing on the basis of the three-dimensional image read out from the three-dimensional image storage unit 151, the line-of-sight data read out from the line-of-sight data storage unit 156, and the curved cross-section data stored in the curved cross-section data storage unit 154. This projection processing will be described in detail later. The generated projection image is output to the image display unit 29 to be displayed in a predetermined form.

(Curved Cross-Sectional Image Generation Processing)

Figure 3:
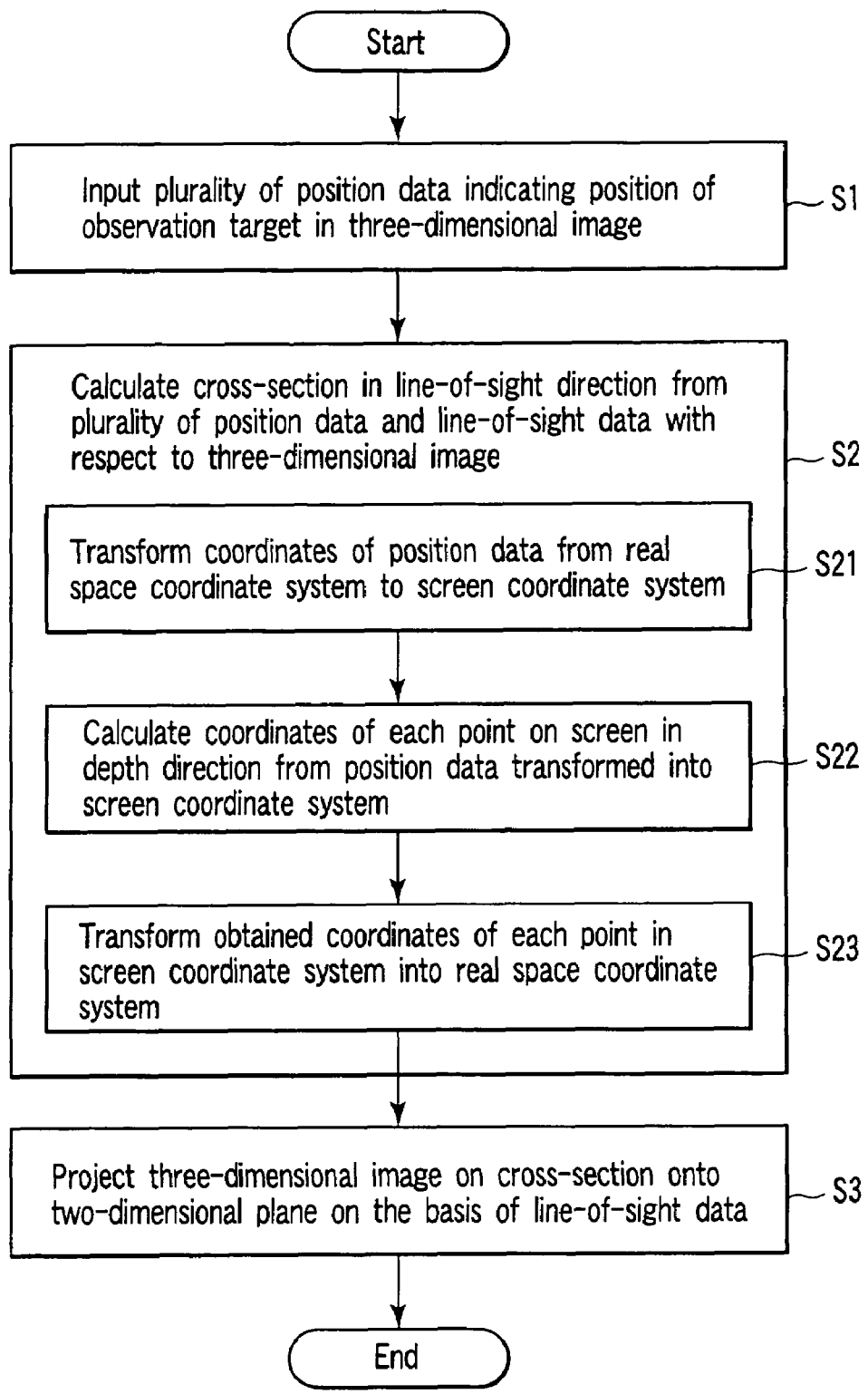
FIG. 3 is a flowchart showing a sequence of curved cross-sectional image generation processing executed by the image processing apparatus 10.
Figure 10:
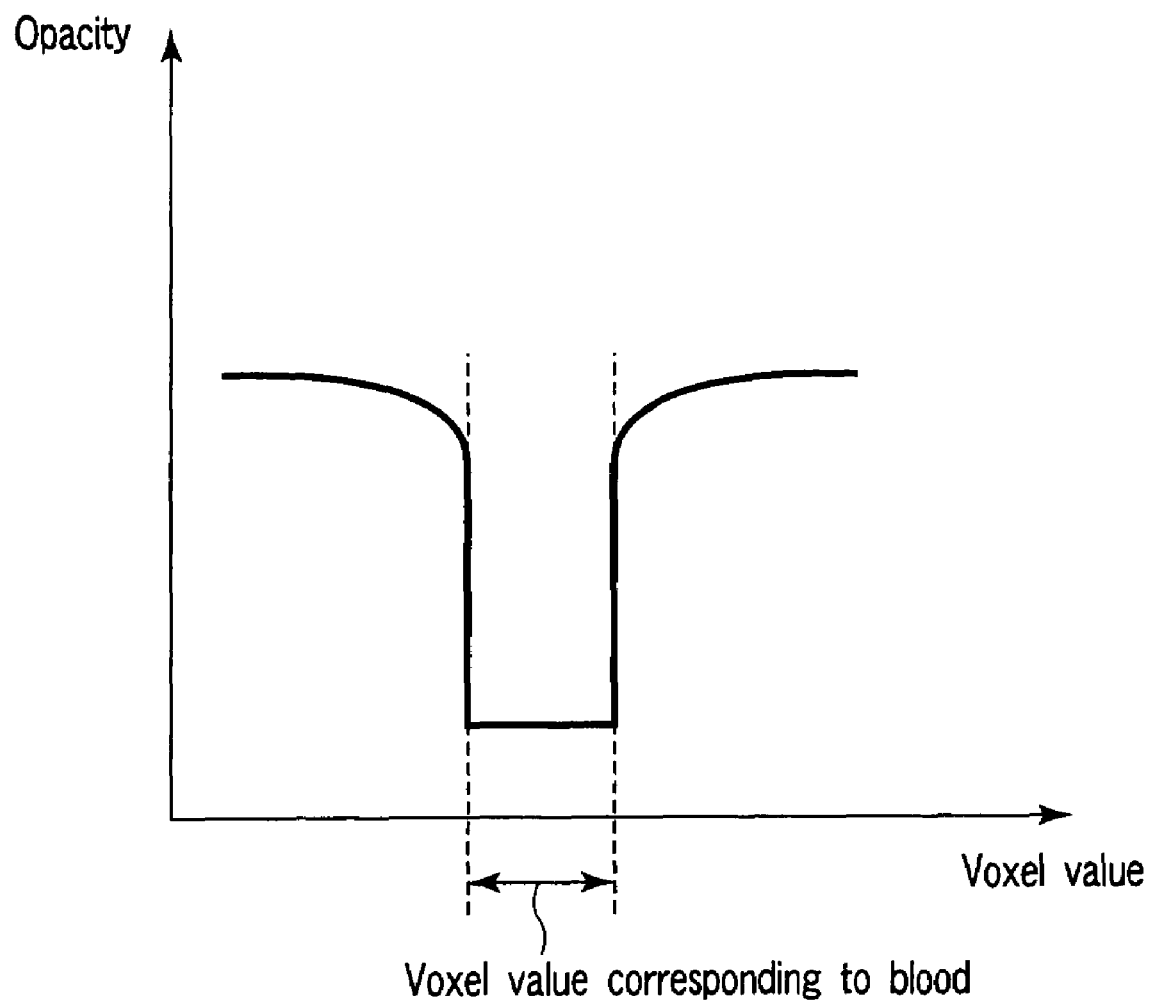
FIG. 10 is a view for explaining the assignment of opacities in volume rendering.

FIG. 3 is a flowchart showing a sequence for curved cross-sectional image generation processing executed by the image processing apparatus 10. As shown in FIG. 10, this curved cross-sectional image generation processing is roughly comprised of the following three steps.

Step S1: A plurality of position data indicating an observation target object in a three-dimensional image are input.

Step S2: A curved cross-section in the line-of-sight direction is obtained from the plurality of position data and line-of-sight data with respect to the three-dimensional image.

Step S3: The three-dimensional image on the curved cross-section is projected on a projection surface on the basis of the line-of-sight data.

The processing in each step will be described in detail below.

[Step S1]

In this step, a plurality of position data indicating the position of an observation target object in a three-dimensional image are input. Assuming that $\underline{n}$ ($\underline{n}$ is a natural number equal to two or more) position data are input, and the overall position data are represented by $^wK$, ith position data $^wK_i$ is data represented by $$\text{position data } ^wK_i : (^wx_i, {}^wy_i, {}^wz_i) i=0, 1, 2, \ldots n-1 \qquad (1)$$

where $^wx_i$, $^wy_i$, $^wz_i$ are the x-coordinate, y-coordinate, and z-coordinate in the real space, respectively.

[Step S2]

In step S2, a curved cross-section is calculated from $\underline{n}$ position data and line-of-sight data input in step S1. The processing executed in this step is comprised of the following three sub-steps as indicated by steps S21 to S23 in FIG. 3.

Step S2-1: The coordinates of position data are transformed from the real space coordinate system into the screen coordinate system.

Step S2-2: The coordinates of each point on the screen in the depth direction are obtained from the position data transformed into the screen coordinate system.

Step S2-3: The obtained coordinates of each point in the screen coordinate system are transformed into those in the real space coordinate system.

Processing in each sub-step will be described below. Note that in the following description, a transformation matrix from the real space coordinate system where volume data are arranged to the screen coordinates system is represented by $^sT_w$, and the inverse transformation matrix thereof is represented by $^wT_s$. $^wT_s$ represents an inverse transformation matrix from the screen coordinate system to the real space coordinate system. $^sT_w$ and $^wT_s$ will be referred to as line-of-sight data as a whole.

[Step S2-1]

In step S2-1, matrix calculation is performed according to equation (2) given below to obtain the coordinates of position data $^sK_i$ in the screen coordinate system, i.e., $(^sx_i, ^sy_i, ^sz_i)$:

$$t[^sx_i {}^sy_i {}^sz_i 1] = {}^sT_w t[^wx_i {}^wy_i {}^wz_i 1] \quad (2)$$

where t[] indicates a transposed matrix. "1" as an element in the transposed matrix is present because $^sT_w$ is data set in consideration of a shift amount (translation amount) between the two coordinate systems.

[Step S2-2]

In step S2-2, the data of each point (pixel) $^sP$ on the screen in the depth direction in the screen coordinate system are obtained from the position data in the screen coordinate system which are obtained in step S2-1. Letting $^sP_{x,y}$ be a point at coordinates $(^sx, ^sy)$ on the screen, obtaining data in the depth direction (line-of-sight direction) is equivalent to obtaining a value $^sz$ of a z-coordinate (information concerning the depth direction) in the screen coordinate system, and a set of $(^sx, ^sy, ^sz)$ is data representing a curved cross-section to be obtained.

The position data $^wK_i$ in the real space transformed into the screen coordinate system will be referred to as $^sK_i$. A distance $D_i$ (i=0, 1, 2, ..., n-1) between $^sP_{x,y}$ and $(^sx_i, ^sy_i)$ is calculated by using a point $(^sx_i, ^sy_i)$ obtained by projecting $^sK_i$ projected on the screen according to equation (3):

$$D_i = ((^sx_i - ^sx)^2 + (^sy_i - ^sy)^2)^{1/2} \quad (3)$$

Figure 4:
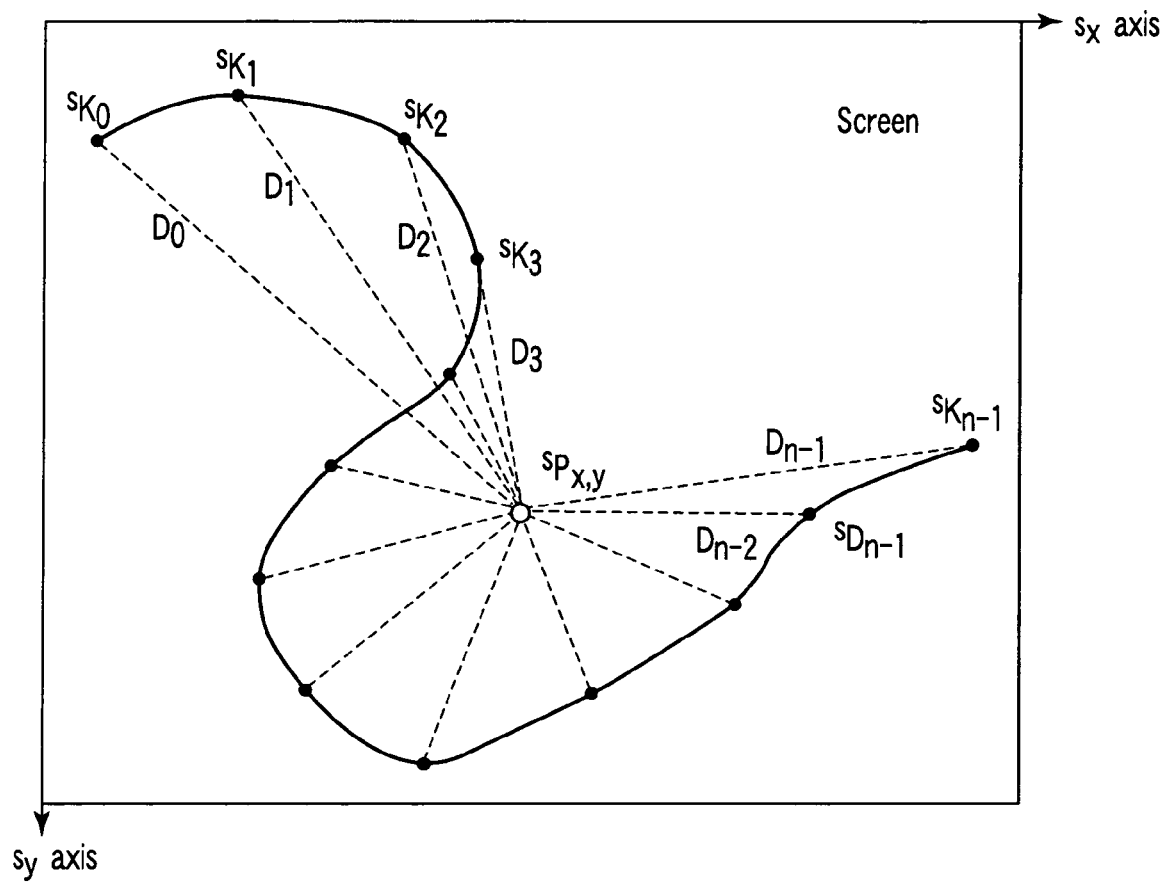
FIG. 4 is a conceptual view showing an example of a distance $D_i$ between points $^sP_{x,y}$ and $(^sx_i, ^sy_i)$ on the screen.

Note that FIG. 4 is a conceptual view showing an example of a distance $D_i$ between the point $^sP_{x,y}$ and $(^sx_i, ^sy_i)$ on the screen.

Subsequently, $^sz$ is obtained according to equations (4) and (5):

$$^sz = \Sigma(\delta_i {}^sz_i)/\Sigma \delta i (i=0, \ldots, n-1) \quad (4)$$

$$\delta_i = 1/D_i^m \quad (5)$$

where $\delta_i$ is a weight, which increases as $D_i$ decreases, i.e., $^sK_i$ becomes closer to the point $(^sx_i, ^sy_i)$.

When this calculation is executed for all the points on the screen, data representing the obtained curved cross-section is obtained. Note as a constant m increases, a smoother curved cross-section is obtained. When $D_i$ becomes zero, i.e., $^sP_{x,y}$ is the same as the position data $^sK_i$, a z-coordinate $^sz_i$ of $^sK_i$ is data in the depth direction.

[Step S2-3]

In step S2-3, the coordinates $(^sx, ^sy, ^sz)$ of the points on the curved cross-section (intermediate curved cross-section) obtained in step S2-2 are transformed into real space coordinates according to equation (6):

$$t[^wx {}^wy {}^wz 1] = {}^wT_s t[^sx {}^sy {}^sz 1] \quad (6)$$

A set of $(^wx, ^wy, ^wz)$ is the data of the curved cross-section in the real space.

[Step S3]

In step S3, projection processing of projecting a three-dimensional image is executed by using the curved cross-section data in the real space in step S2. That is, in step S3, with respect to each point $(^sx, ^sy)$ on the screen, pixel values (voxels) $V(^wx, ^wy, ^wz)$ of the three-dimensional image at the coordinates $(^wx, ^wy, ^wz)$ in the real space corresponding to the coordinates $(^sx, ^sy, ^sz)$ obtained in step S2-2 are obtained, and projection processing is performed with the obtained pixel values being pixel values at $(^sx, ^sy)$.

Figure 5A:
FIGS. 5A and 5B are views for explaining the results obtained by executing curved cross-sectional image generation processing for a three-dimensional CT image containing the aorta.
Figure 5B:

FIGS. 5A and 5B are views for explaining the result obtained by executing this curved cross-sectional image generation processing for a three-dimensional CT image containing the aorta. That is, FIG. 5A shows data $^sz$ in the depth direction obtained in step S2-2 as an image, with a black portion indicating that it is located closer to the front side than a white portion. A line-of-sight direction is set in a direction in which a CT image is observed from almost the front surface side relative to the patient, and the value of m in step S2-2 is set to 8. FIG. 5B shows the result obtained by executing processing up to step S3. A cross-sectional shape of the overall aorta seen from the line-of-sight direction is displayed in a manner easy to understand. In addition, since the line-of-sight direction is kept unchanged, the resultant image is natural to the observer. For reference, a curve indicating the position of the blood vessel center line of the aorta is superimposed on the image.

Note that as position data, data indicating the position of the blood vessel center line of the aorta is used. In order to obtain the position data of the blood vessel center line of the aorta, for example, one of the techniques disclosed in the following references can be used: Ali Shahrokni et al., "Fast skeltonization algorithm for 3-D elongated objects", Proceedings of SPIE Vol. 4322, pp. 323-330, 2001, U.S. Pat. No. 5,971,767, and Onno Wink, Wiro J. Niessen, "Fast Delineation and Visualization of Vessels in 3-D Angiographic Images", IEEE Trans. Med. Image., Vol. 19, No. 4, 2000.

(Modification 1)

A modification of this embodiment will be described next. In this modification, a projection method of performing projection with a thickness being provided for the curved cross-section obtained in step S2 is used in step S3.

That is, predetermined thicknesses are provided for the front and back sides on the curved cross-section obtained in step S2 in the line-of-sight direction so as to set a projection area with a thickness corresponding to L voxels. The maximum voxel value of those of voxels which are located on a line of sight perpendicular to each point on the screen and fall within a projection area through which the line of sight passes is projected as the pixel value of the corresponding point on the screen. This processing is known well as maximum intensity projection.

Figure 5C:
FIG. 5C is a view for explaining modification 1 of this embodiment.
Figure 6:
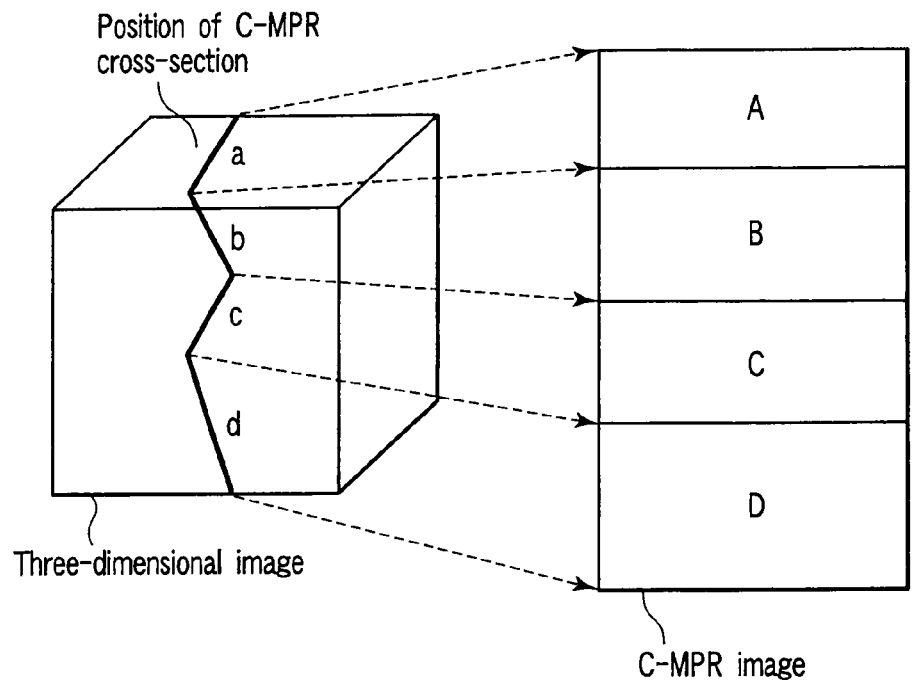
FIG. 6 is a conceptual view for explaining C-MPR as a cross-section display technique for an observation target.
Figure 7:
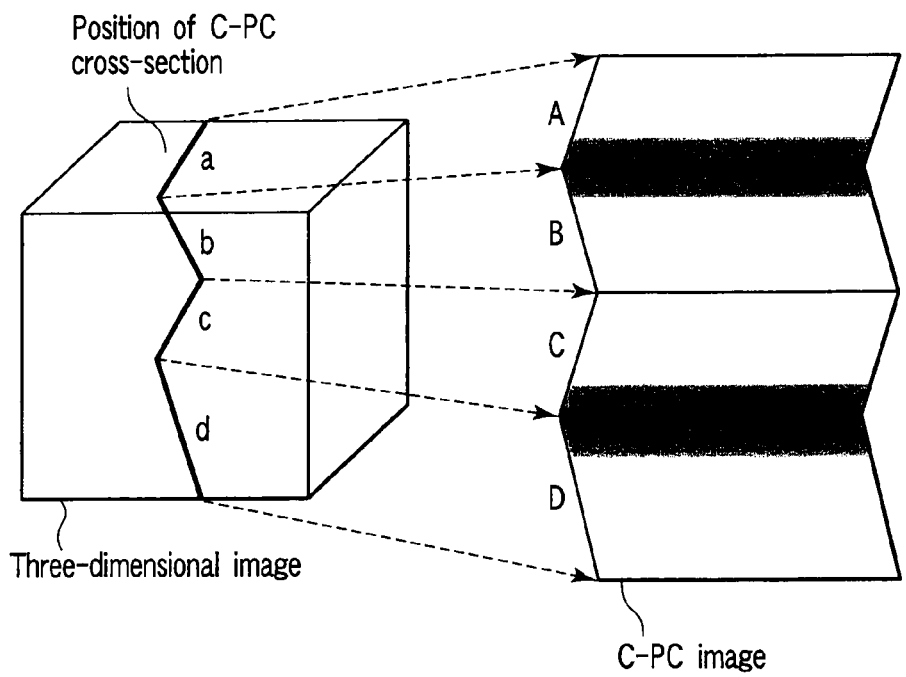
FIG. 7 is a conceptual view for explaining C-PC as a cross-section display technique for an observation target.

FIG. 5C shows an image obtained in this modification by setting L=20 using the same three-dimensional CT image and blood vessel center line data as those in FIG. 5A. Referring to FIG. 5C, the image allows the observer to easily comprehend the overall shape of the aorta viewed from the line-of-sight direction and more easily grasp the blood vessels, organs, and bones around the aorta.

In addition, thickness need not be constant. For example, an overall area located deeper than a curved cross-section in the line-of-sight direction may be projected. In addition, a projection method other than maximum intensity projection may be used. For example, various kinds of projection methods can be used in accordance with the region of interest, e.g., so-called volume rendering of performing projection by using opacities and colors.

(Modification 2)

Another modification of this embodiment will be described next. In this modification, a line-of-sight direction can be arbitrarily changed.

That is, the line-of-sight data changing unit 155 calculates an amount of change in line of sight on the basis of a line-of-sight direction change instruction (e.g., an instruction to move a pointer by a predetermined amount in a predetermined direction) from the input unit 21 such as a mouse or trackball, and generates new line-of-sight data.

The transmission/reception unit 17 calculates curved cross-section data on screen coordinates on the basis of the changed line-of-sight direction. The three-dimensional image projection unit 157 generates a projection image by projecting a curved cross-section in the real space on the basis of the changed line-of-sight direction. The obtained projection image is displayed on the display unit 19 in a predetermined form.

When the above series of processing is repeated, a curved cross-sectional image is generated and displayed every time the operator changes the line-of-sight direction. This allows the operator to observe a cross-section of a curved observation target from various directions by only operating the input unit to change the line-of-sight direction. Obviously, when the same projection processing as that in modification 1 is executed in step S3, an area containing a curved cross-section and having a thickness is projected.

According to the above arrangement, the following effects can be obtained.

This image processing apparatus obtains a curved cross-section in the real space from a winding cross-section on the screen which includes a winding observation target, and projects data on a curved cross-section in the real space or an area including the curved cross-section and having a thickness. This makes it possible to provide a projection image which allows to easily comprehend the shape of the overall observation target as compared with the conventional technique of observing a winding observation target upon transforming its cross-section into planes.

According to this image processing apparatus, a curved cross-section in the real space is calculated from position data set with respect to a curved observation target and the data of a line-of-sight direction, and a curved cross-sectional image is generated by projecting the curved cross-section. This curved cross-section in the real space is obtained from the position data transformed into the screen coordinate system by using the coordinates of each point on the screen in the depth direction in accordance with the line-of-sight direction. Therefore, since a projection image is generated by using a curved cross-section in the real space viewed from the same direction as that in which the observer observes a three-dimensional image, a projection image can be provided, which allows to observe the winding observation target in a natural manner as compared with the conventional technique of generating an image from a direction different from the direction in which the observer observes the three-dimensional image.

According to this image processing apparatus, when the line-of-sight direction is changed, even if new cross-sectional position data is not input, a new curved cross-section in the real space viewed from the changed line-of-sight direction is generated, and a projection image is generated by this. In contrast to this, according to the conventional technique, even when the line-of-sight direction is changed, a new cross-sectional image cannot be generated unless new cross-sectional position data is input. In contrast to the prior art, therefore, a projection image can be provided, which allows the observer to observe a winding observation target in a natural manner regardless of how a line-of-sight direction is set.

SECOND EMBODIMENT

The second embodiment of the present invention will be described next. An image processing apparatus according to this embodiment has a function (blood vessel inner wall visualizing function) of visualizing a blood vessel inner wall by using a curved cross-section obtained in the first embodiment. The contents of this function and processing based thereon will be described in accordance with this embodiment. For the sake of descriptive convenience, a curved cross-section acquired in step S2 in FIG. 3 will be referred to as a "first type curved cross-section". In addition, a curved cross-section generated by processing (blood vessel inner wall visualization processing) based on the blood vessel inner wall visualizing function using the first type curved cross-section will be referred to as a "second type curved cross-section".

EXAMPLE 1

Example 1 is directed to generate a second type curved cross-section by replacing a blood area existing on a first type curved cross-section with a non-blood area appearing first from the blood area in the depth direction along the line-of-sight direction.

Figure 8:
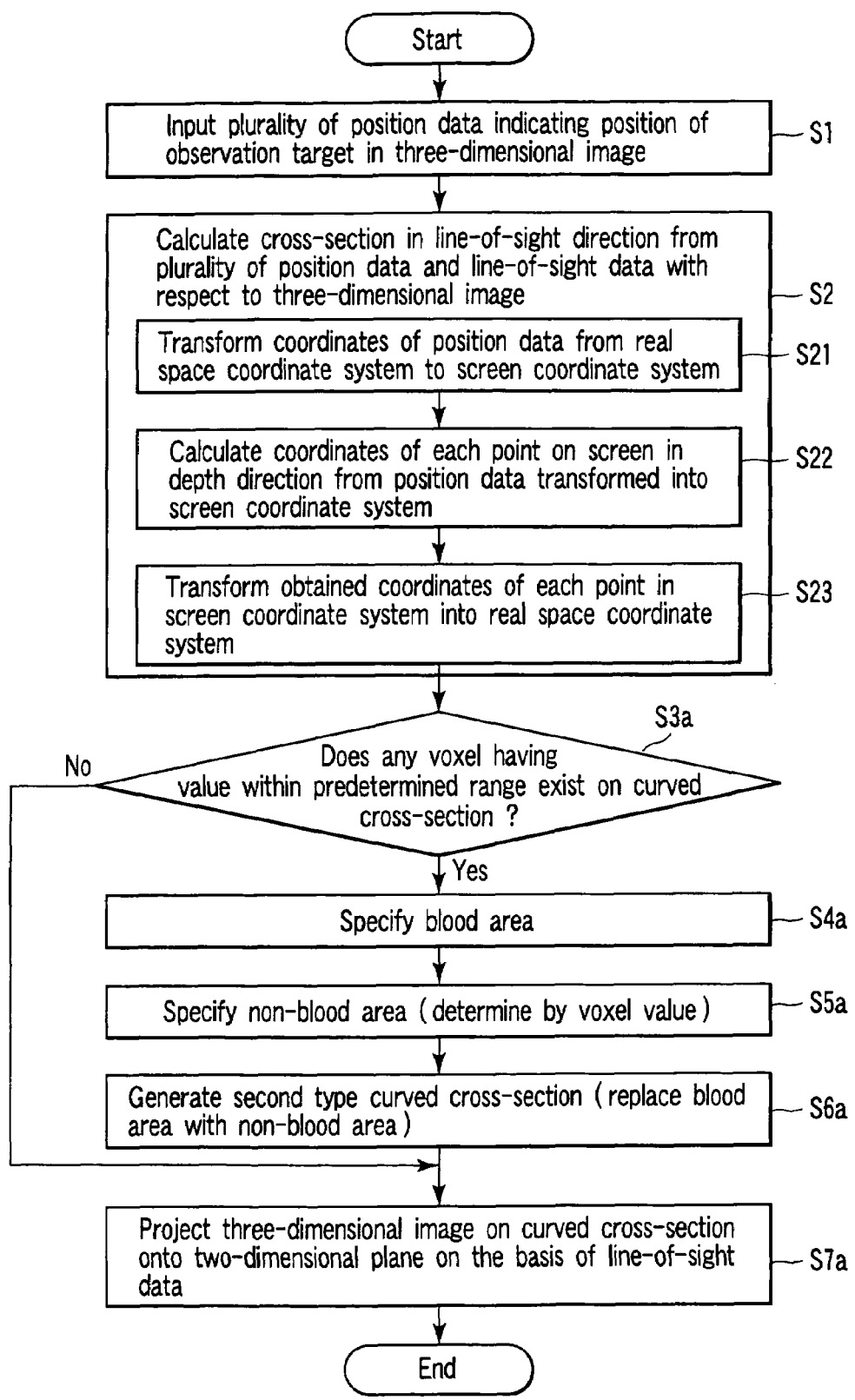
FIG. 8 is a flowchart showing the flow of blood vessel inner wall visualization processing according to embodiment 1.

FIG. 8 is a flowchart showing the flow of blood vessel inner wall visualization processing according to this example. First of all, as shown in FIG. 8, a plurality of position data indicating the position of an observation target in a three-dimensional image are input (step S1), and a first type curved cross-section in the line-of-sight direction is calculated from the input plurality of position data and line-of-sight data with respect to a three-dimensional image (step S2). These processes are the same as those in the first embodiment.

A curved cross-section data computing unit 153 determines whether a voxel having a value (a value regarded as representing blood) within a predetermined range exists on the first type curved cross-section (step S3a). If it is determined that no corresponding voxel exists on the first type curved cross-section, a three-dimensional image projection unit 157 generates a display image by projecting three-dimensional data on the first type curved cross-section onto a two-dimensional plane on the basis of the line-of-sight data (step S7a). This processing is the same as that in step S3 in FIG. 3.

If it is determined that a voxel having a value within the predetermined range exists on the first curved cross-section, the curved cross-section data computing unit 153 specifies a blood area existing on the first type curved cross-section by extracting the corresponding voxel (step S4a).

The curved cross-section data computing unit 153 then determines a voxel value from each position in the blood area along the line-of-sight depth direction, and specifies the first voxel having a value which does not correspond to blood, thereby specifying a non-blood area (i.e., a blood vessel inner wall) (step S5a). The curved cross-section data computing unit 153 generates a second type curved cross-section including a blood vessel inner wall by replacing the blood area on the first type curved cross-section with the specified non-blood area (step S6a).

The three-dimensional image projection unit 157 then generates a display image by projecting three-dimensional data on the generated second type curved cross-section onto a two-dimensional plane on the basis of line-of-sight data (step S7a)

EXAMPLE 2

Example 2 is directed to actively visualize a blood vessel inner wall by performing clipping processing of removing data located closer to the front side than the first type curved cross-section and volume rendering processing of assigning 0 or low opacity (relative to the tissue) to a voxel having a value (a value regarded as representing blood) within a predetermined range.

Figure 9:
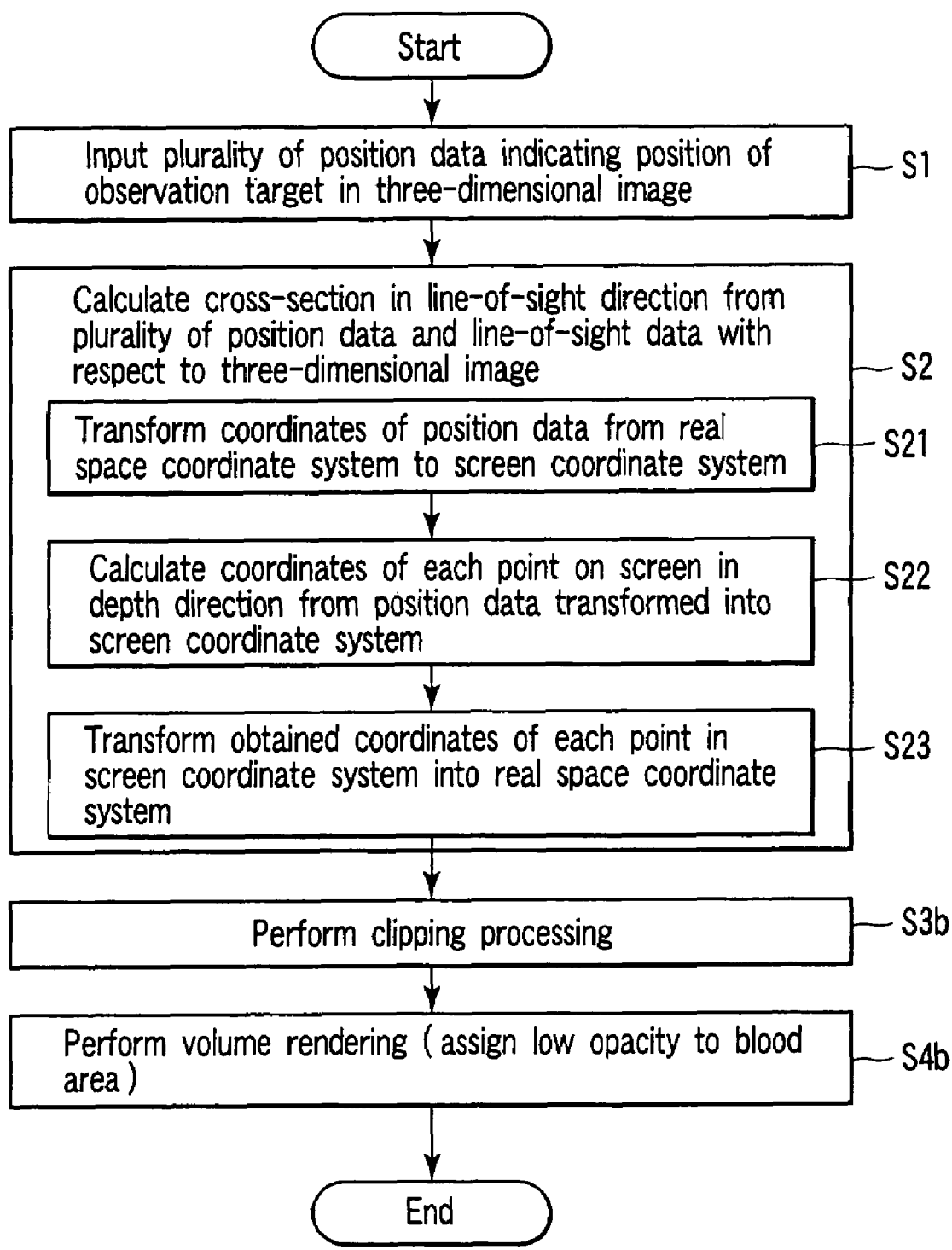
FIG. 9 is a flowchart showing the flow of blood vessel inner wall visualization processing according to embodiment 2.

FIG. 9 is a flowchart showing the flow of blood vessel inner wall visualization processing according to this example. As shown in FIG. 9, a plurality of position data indicating the position of an observation target in a three-dimensional image are input (step S1). A first type curved cross-section in the line-of-sight direction is calculated from the input plurality of position data and line-of-sight data with respect to the three-dimensional image (step S2). These processes are the same as those in the first embodiment.

Subsequently, a three-dimensional image projection unit 157 uses the first type curved cross-section as a clipping surface and performs clipping processing of removing data located closer to the front side than the clipping surface (step S3b). The three-dimensional image projection unit 157 executes volume rendering processing of assigning a low opacity (or an opacity of 0) to a voxel having a value corresponding to blood (step S4b) by using the clipped data, as shown in FIG. 10. This makes it possible to generate a volume rendering image visualizing the blood vessel inner wall. Note that the opacity to be assigned to a voxel having a value corresponding to blood can be set to an arbitrary value.

EXAMPLE 3

Example 3 is directed to generate a second type curved cross-section by specifying a blood vessel inner wall using a blood vessel center line acquired in the first embodiment and replacing a blood area on a first type curved cross-section with the blood vessel inner wall.

Figure 11:
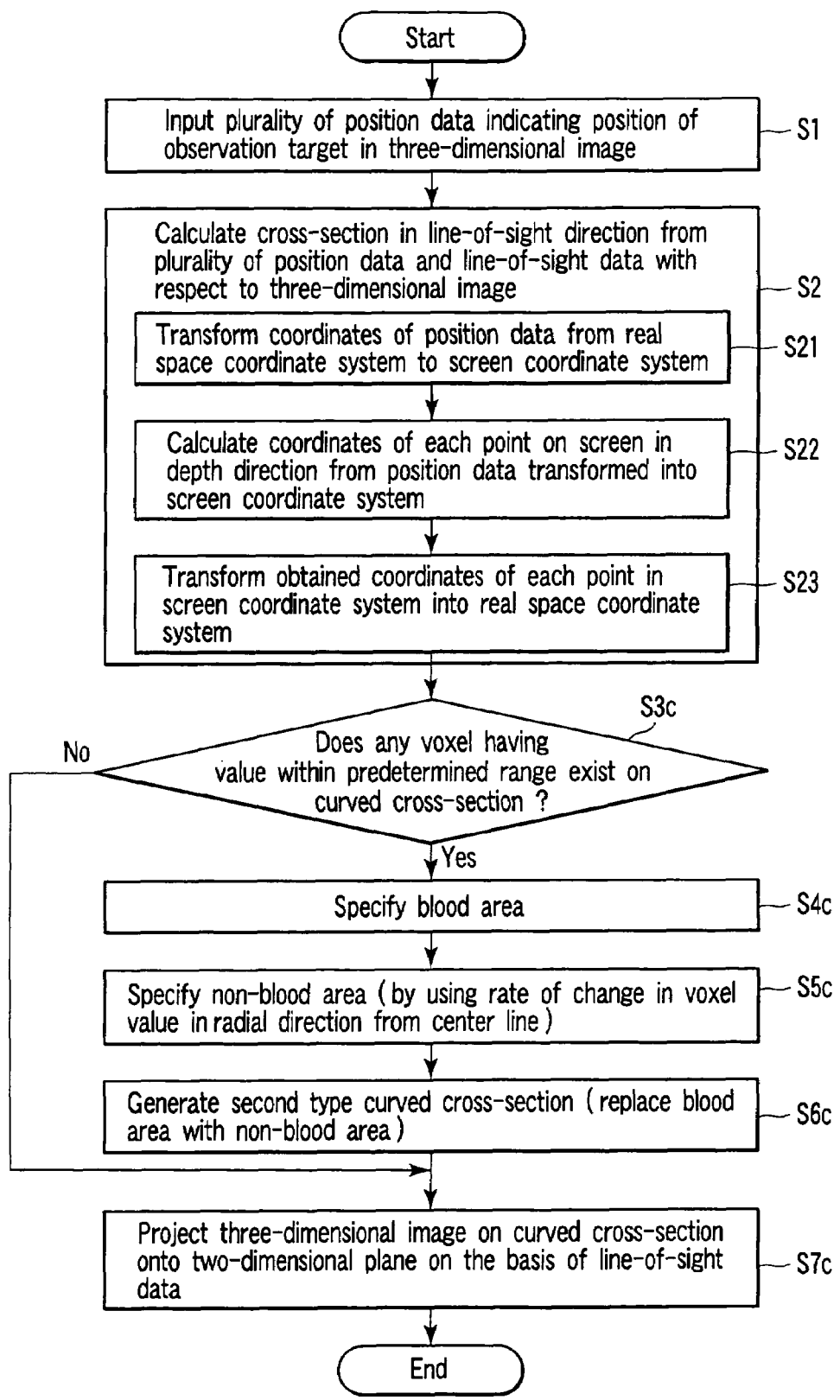
FIG. 11 is a flowchart showing the flow of blood vessel inner wall visualization processing according to embodiment 3.

FIG. 11 is a flowchart showing the flow of blood vessel inner wall visualization processing according to this example. First of all, as shown in FIG. 11, a plurality of position data indicating the position of an observation target in a three-dimensional image are input (step S1). A first type curved cross-section in the line-of-sight direction is calculated from the input plurality of position data and line-of-sight data with respect to the three-dimensional image (step S2). These processes are the same as those in the first embodiment.

A curved cross-section data computing unit 153 then determines whether a voxel having a value corresponding to blood exists on a first type curved cross-section (step S3c). If it is determined that no corresponding voxel exists on the first type curved cross-section, a three-dimensional image projection unit 157 generates a display image by projecting three-dimensional data on the first curved cross-section onto a two-dimensional plane on the basis of line-of-sight data (step S7c). This processing is the same as that in step S3 in FIG. 3.

If it is determined that a voxel having a value within the predetermined range exists on the first type curved cross-section, the curved cross-section data computing unit 153 specifies a blood area existing on the first type curved cross-section by extracting the corresponding voxel (step S4c).

Figure 12:
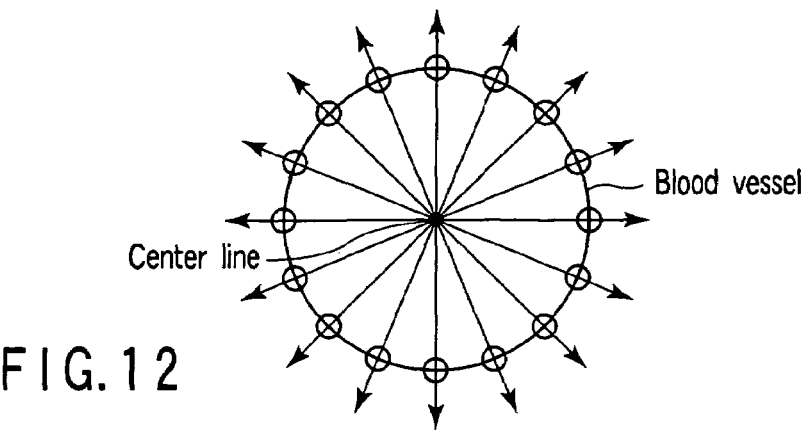
FIG. 12 is a view for explaining a non-blood area specifying technique using a blood vessel center line.
Figure 13:
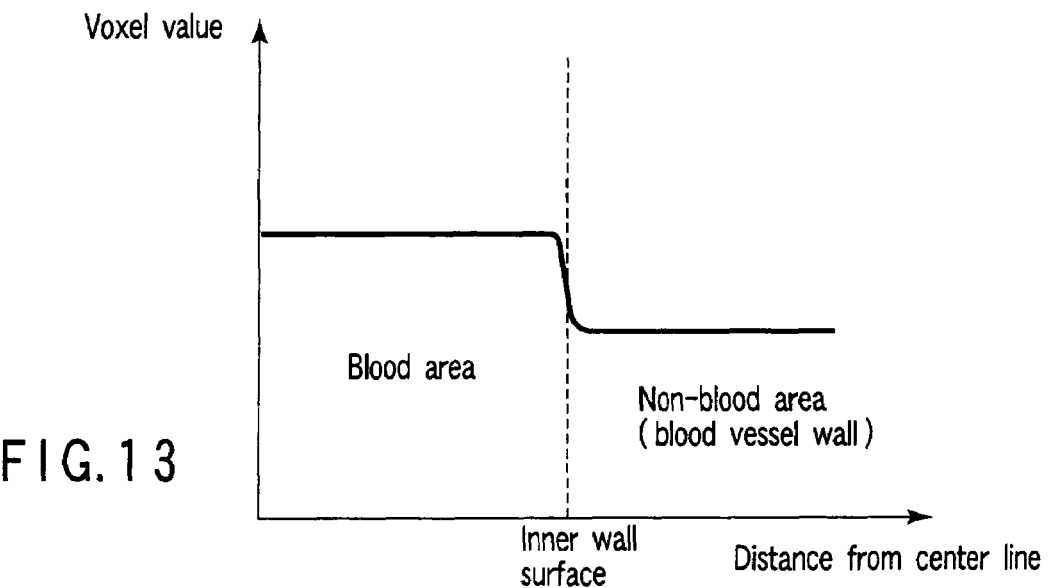
FIG. 13 is a view showing a change in voxel value along a radial direction.

As shown in FIG. 12, the curved cross-section data computing unit 153 determines voxel values at all angles along the radial direction from the blood vessel center line. For example, as shown in FIG. 13, the curved cross-section data computing unit 153 then specifies a non-blood area (i.e., a blood vessel inner wall) by specifying the first voxel, at each angle, whose voxel value changes by a predetermined threshold or more (step S5c). In addition, the curved cross-section data computing unit 153 generates a second type curved cross-section containing a blood vessel inner wall by replacing a blood area on the first type curved cross-section with a non-blood area existing at a deeper position from the blood area along the line-of-sight depth direction (step S6c).

The three-dimensional image projection unit 157 generates a display image by projecting three-dimensional data on the generated second type curved cross-section onto a two-dimensional plane on the basis of line-of-sight data (step S7c).

In step S5c in this embodiment, a blood vessel inner wall may be specified with reference to a voxel value itself instead of a rate of change in voxel value. That is, a blood vessel inner wall can be specified by determining voxel values along all radial directions from the blood vessel center line and specifying the first voxel having a value which does not correspond to blood.

Figure 14:
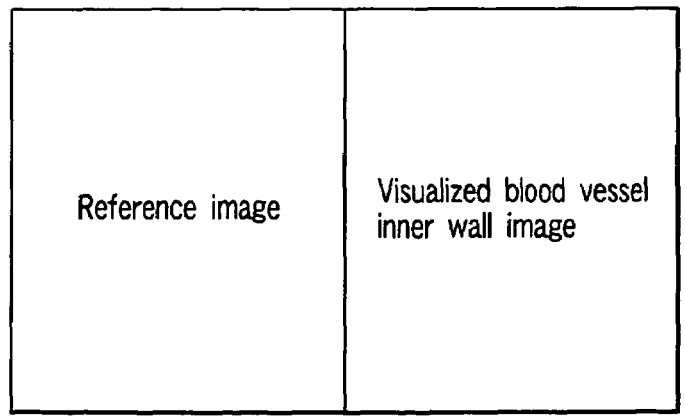
FIG. 14 is a view showing an example of the display form of a reference image.

The visualized blood vessel inner wall image generated by each technique described above is displayed on a display unit 19 independently or together with a reference image in, for example, the form shown in FIG. 14. In this case, the reference image is an image obtained by visualizing the same target as that for the display image acquired by a technique based on the first or second embodiment from the same line-of-sight direction. A typical example of this image is a volume rendering image with respect to the same target from the same line-of-sight direction. This reference image may be an image acquired by any kind of modality. When a reference image is to be displayed in a form like that shown in FIG. 14, the line-of-sight direction, enlargement ratio, or the like of the reference image is preferably changed in synchronism with a change in the line-of-sight direction, enlargement ratio, or the like of, for example, a visualized blood vessel inner wall image.

In addition, a display unit 19 may display a visualized blood vessel inner wall image together with an image visualizing blood as shown in FIGS. 5B and 5C. The display unit 19 may also display a visualized blood vessel inner wall image, an image visualizing blood, and a reference image synchronously and simultaneously, as needed.

According to the above arrangement, the following effects can be obtained.

This image processing apparatus can generate and display a visualized blood vessel inner wall image as if blood were removed from the blood vessel image shown in FIG. 5B or 5C to bring the blood vessel inner wall into sight. Therefore, a blood vessel inner wall which cannot be observed in the prior art can be freely observed. This can contribute to an improvement in quality of medical practice.

In addition, a visualized blood vessel inner wall image can be displayed, together with a reference image, in correspondence with each other. The observer can therefore observe an entire diagnosis region in association with a reference image, and a detailed region in association with a visualized blood vessel inner wall image. Furthermore, using the image acquired in the first embodiment makes it possible to freely observe an image with or without blood in the blood vessel in accordance with a purpose. This makes it possible to provide new diagnosis information and increase the degree of freedom in diagnosis information selection.

Note that the present invention is not directly limited to each embodiment described above and can be embodied by modifying constituent elements in the execution stage without departing from the gist of the invention. For example, the following are specific modifications.

Each embodiment described above has exemplified the image processing apparatus which executes a series of processing from, for example, setting position data with respect to a three-dimensional CT image to the formation of a projection image of a curved cross-section. In contrast to this, this apparatus may be designed to generate a projection image of a curved cross-section by using at least one of position data, curved cross-section data, line-of-sight data, and the like stored in the main storage unit 13 or the like in advance. In such a case, since data stored in advance is used, input operation by the observer can be omitted. In addition, predetermined data generation processing operation can be omitted.

In addition, various inventions can be formed by proper combinations of a plurality of constituent elements disclosed in the above embodiments. For example, several constituent elements may be omitted from all the constituent elements disclosed in the above embodiments. Furthermore, constituent elements in the different embodiments may be properly combined.

What is claimed is:

1. An image processing apparatus comprising:
 a position data specifying unit which specifies a plurality of position data indicating a position of an input observation target on three-dimensional image data of the observation target;
 a curved cross-section calculating unit which calculates a first curved cross-section in a desired line-of-sight direction from said plurality of position data and line-of-sight data including the line-of-sight direction by using depth information concerning the line-of-sight direction of said each position data;
 a projection image generating unit which generates a projection image by projecting the three-dimensional image data on the first curved cross-section or three-dimensional image data concerning an area with reference to the first curved cross-section onto a projection surface along the line-of-sight direction; and
 a display unit which displays the projection image.

2. An apparatus according to claim 1, wherein the curved cross-section calculating unit calculates the first curved cross-section by using a weight with a coefficient which changes in accordance with distances from said plurality of position data.

3. An apparatus according to claim 1, wherein the curved cross-section calculating unit calculates an intermediate curved cross-section in a screen coordinate system by transforming said plurality of position data set on the three-dimensional image data into the screen coordinate system, and using information concerning a depth of said each position data in the screen coordinate system, and calculates the first curved cross-section in the line-of-sight direction by inversely transforming the intermediate curved cross-section into a three-dimensional space.

4. An apparatus according to claim 1, which further comprises a line-of-sight changing unit which changes the line-of-sight data, and in which
 when the line-of-sight data is changed by the line-of-sight changing unit, the curved cross-section calculating unit calculates the first curved cross-section by using the changed line-of-sight data.

5. An apparatus according to claim 1, wherein
 the curved cross-section calculating unit specifies a blood area which exists on the first curved cross-section and a non-blood area which appears first from the blood area along the line-of-sight direction on the basis of a value of each voxel forming the three-dimensional image data, and generates a second curved cross-section by replacing the blood area existing on the first curved cross-section with the non-blood area, and
 the projection image generating unit generates the projection image by projecting the three-dimensional image data on the second curved cross-section or three-dimensional image data concerning an area with reference to the second curved cross-section onto a projection surface along the line-of-sight direction.

6. An apparatus according to claim 1, wherein the projection image generating unit generates clipping data by executing clipping processing of removing data located closer to a front side than the first curved cross-section from three-dimensional image data of the observation target, and generates the projection image by executing volume rendering of assigning a low opacity relative to tissue to a voxel having a value corresponding to blood by using the clipping data.

7. An apparatus according to claim 1, wherein
 the curved cross-section calculating unit specifies a blood area which exists on the first curved cross-section and a non-blood area which appears first from the blood area along the line-of-sight direction on the basis of said plurality of position data and a rate of change in value of each voxel forming the three-dimensional image data, and generates a second curved cross-section by replacing the blood area existing on the first curved cross-section with the non-blood area, and
 the projection image generating unit generates the projection image by projecting the three-dimensional image on the second curved cross-section or a three-dimensional image concerning an area with reference to the second curved cross-section onto a projection surface along the line-of-sight direction.

8. An apparatus according to claim 1, wherein the display unit simultaneously displays the projection image and a reference image visualizing the observation target from the line-of-sight direction in correspondence with each other.

9. An apparatus according to claim 1, wherein the position data is data concerning a blood vessel center line.

10. A medical image diagnosis apparatus comprising:
 an acquiring unit which acquires three-dimensional image data of an observation target;
 a position data specifying unit which specifies a plurality of position data indicating a position of the observation target on the three-dimensional image data;
 a curved cross-section calculating unit which calculates a first curved cross-section in the line-of-sight direction from said plurality of position data and line-of-sight data including a desired line-of-sight direction by using depth information concerning the line-of-sight direction of said each position data;
 a projection image generating unit which generates a projection image by projecting the three-dimensional image data on the first curved cross-section or three-dimensional image data concerning an area with reference to the first curved cross-section onto a projection surface along the line-of-sight direction; and
 a display unit which displays the projection image.

11. An apparatus according to claim 10, wherein the curved cross-section calculating unit calculates the first curved cross-section by using a weight with a coefficient which changes in accordance with distances from said plurality of position data.

12. An apparatus according to claim 10, wherein the curved cross-section calculating unit calculates an intermediate curved cross-section in a screen coordinate system by transforming said plurality of position data set on the three-dimensional image data into the screen coordinate system, and using information concerning a depth of said each position data in the screen coordinate system, and calculates the first curved cross-section in the line-of-sight direction by inversely transforming the intermediate curved cross-section into a three-dimensional space.

13. An apparatus according to claim 10, which further comprises a line-of-sight changing unit which changes the line-of-sight data, and in which when the line-of-sight data is changed by the line-of-sight changing unit, the curved cross-section calculating unit calculates the first curved cross-section by using the changed line-of-sight data.

14. An apparatus according to claim 10, wherein the curved cross-section calculating unit specifies a blood area which exists on the first curved cross-section and a non-blood area which appears first from the blood area along the line-of-sight direction on the basis of a value of each voxel forming the three-dimensional image data, and generates a second curved cross-section by replacing the blood area existing on the first curved cross-section with the non-blood area, and the projection image generating unit generates the projection image by projecting the three-dimensional image data on the second curved cross-section or three-dimensional image data concerning an area with reference to the second curved cross-section onto a projection surface along the line-of-sight direction.

15. An apparatus according to claim 10, wherein the projection image generating unit generates clipping data by executing clipping processing of removing data located closer to a front side than the first curved cross-section from three-dimensional image data of the observation target, and generates the projection image by executing volume rendering of assigning a low opacity relative to tissue to a voxel having a value corresponding to blood by using the clipping data.

16. An apparatus according to claim 10, wherein the curved cross-section calculating unit specifies a blood area which exists on the first curved cross-section and a non-blood area which appears first from the blood area along the line-of-sight direction on the basis of said plurality of position data and a rate of change in value of each voxel forming the three-dimensional image data, and generates a second curved cross-section by replacing the blood area existing on the first curved cross-section with the non-blood area, and the projection image generating unit generates the projection image by projecting the three-dimensional image on the second curved cross-section or a three-dimensional image concerning an area with reference to the second curved cross-section onto a projection surface along the line-of-sight direction.

17. An apparatus according to claim 10, wherein the display unit simultaneously displays the projection image and a reference image visualizing the observation target from the line-of-sight direction in correspondence with each other.

18. An apparatus according to claim 10, wherein the position data is data concerning a blood vessel center line.

19. An image processing method comprising:

specifying a plurality of position data indicating a position of an input observation target on three-dimensional image data of the observation target;

calculating a first curved cross-section in a desired line-of-sight direction from said plurality of position data and line-of-sight data including the line-of-sight direction by using depth information concerning the line-of-sight direction of said each position data;

generating a projection image by projecting the three-dimensional image data on the first curved cross-section or three-dimensional image data concerning an area with reference to the first curved cross-section onto a projection surface along the line-of-sight direction; and displaying the projection image.

20. A method according to claim 19, wherein in calculating the first curved cross-section, the first curved cross-section is calculated by using a weight with a coefficient which changes in accordance with distances from said plurality of position data.

21. A method according to claim 19, further comprising:

specifying a blood area which exists on the first curved cross-section and a non-blood area which appears first from the blood area along the line-of-sight direction on the basis of a value of each voxel forming the three-dimensional image data;

generating a second curved cross-section by replacing the blood area existing on the first curved cross-section with the non-blood area; and generating the projection image by projecting the three-dimensional image data on the second curved cross-section or three-dimensional image data concerning an area with reference to the second curved cross-section onto a projection surface along the line-of-sight direction.

22. A method according to claim 19, further comprising:

generating clipping data by executing clipping processing of removing data located closer to a front side than the first curved cross-section from three-dimensional image data of the observation target; and generating the projection image by executing volume rendering of assigning a low opacity relative to tissue to a voxel having a value corresponding to blood by using the clipping data.

23. A method according to claim 19, further comprising:

specifying a blood area which exists on the first curved cross-section and a non-blood area which appears first from the blood area along the line-of-sight direction on the basis of said plurality of position data and a rate of change in value of each voxel forming the three-dimensional image data;

generating a second curved cross-section by replacing the blood area existing on the first curved cross-section with the non-blood area; and generating the projection image by projecting the three-dimensional image on the second curved cross-section or a three-dimensional image concerning an area with reference to the second curved cross-section onto a projection surface along the line-of-sight direction.

24. A method according to claim 19, wherein in displaying the projection image, the projection image and a reference image visualizing the observation target from the line-of-sight direction are displayed in correspondence with each other.

* * * * *